US005624528A

United States Patent [19]

Abrams et al.

[11] Patent Number: 5,624,528

[45] **Date of Patent: *Apr. 29, 1997**

[54] APPARATUS FOR ATTACHING A SPOUT TO A CARTON

[75] Inventors: Robert S. Abrams, Albany, N.Y.; Joseph H. Miller, Farmington, Conn.

[73] Assignee: Tetra Rex Packaging Systems, Inc., Buffalo Grove, Ill.

[*] Notice: The term of this patent shall not extend beyond the expiration date of Pat. No. 5,219,320.

[21] Appl. No.: 239,687

[22] Filed: May 9, 1994

Related U.S. Application Data

[62] Division of Ser. No. 953,698, Sep. 30, 1992, Pat. No. 5,338,385.

[51] Int. Cl.[6] .................................................. B32B 31/00

[52] U.S. Cl. .......................... 156/556; 156/69; 156/322; 156/497; 156/514; 53/133.2; 198/428; 493/212

[58] Field of Search .............................. 156/69, 252, 253, 156/513, 514, 515, 517, 556, 322, 497; 53/133.1, 133.2, 168, 300, 311, 312, 313, 319, 320, 420, 426, 478, 485, 488, 489; 493/87, 120, 210, 212, 213, 214, 414, 498, 901; 198/428, 463.3, 486.6, 468.8

[56] References Cited

U.S. PATENT DOCUMENTS

| | | | |
|---|---|---|---|
| 1,538,612 | 5/1925 | Betner . | |
| 1,989,039 | 1/1935 | Geyer . | |
| 2,360,435 | 10/1944 | Martin . | |
| 2,916,182 | 12/1959 | Rollins et al. . | |
| 2,972,184 | 2/1961 | Andrew . | |
| 3,144,816 | 8/1964 | Walker et al. . | |
| 3,307,714 | 3/1967 | Maciejaczak . | |
| 3,400,866 | 9/1968 | Fattori . | |
| 3,412,919 | 11/1968 | Cain . | |
| 3,570,647 | 3/1971 | Meikle et al. | 198/468.6 |
| 4,054,240 | 10/1977 | La Pierre | 229/17 R |
| 4,055,032 | 10/1977 | Hammond . | |
| 4,246,062 | 1/1981 | Christine . | |
| 4,507,168 | 3/1985 | Konaka | 156/322 X |
| 4,566,250 | 1/1986 | Matsumura et al. . | |
| 4,592,690 | 6/1986 | Busch . | |
| 4,604,850 | 8/1986 | Reil . | |
| 4,615,655 | 10/1986 | Dixon . | |
| 4,660,353 | 4/1987 | Greenwell . | |
| 4,661,091 | 4/1987 | Moen . | |
| 4,669,640 | 6/1987 | Ando et al. . | |
| 4,712,665 | 12/1987 | McDonald et al. . | |
| 4,788,811 | 12/1988 | Kawajiri et al. . | |
| 4,795,065 | 1/1989 | Ashizawa et al. . | |
| 4,813,578 | 3/1989 | Gordon et al. . | |
| 4,848,974 | 7/1989 | Wayt | 406/88 |
| 4,866,907 | 9/1989 | Iuchi et al. . | |
| 4,909,434 | 3/1990 | Jones et al. . | |
| 5,006,197 | 4/1991 | Newkirk et al. | 156/514 |
| 5,108,029 | 4/1992 | Abrams et al. . | |
| 5,169,374 | 12/1992 | Abrams et al. . | |
| 5,219,320 | 6/1993 | Abrams et al. | 493/8 |

FOREIGN PATENT DOCUMENTS

| | | |
|---|---|---|
| 1284-775 | 1/1987 | U.S.S.R. . |

*Primary Examiner*—James Engel
*Attorney, Agent, or Firm*—Burns, Doane, Swecker & Mathis, L.L.P.

[57] ABSTRACT

An apparatus for attaching a spout to a planar portion of an article, such as a milk or juice carton, which may be integrated into conventional carton forming and filling machines, includes a heater for heating a stem of a spout, a bonding application site for applying a bonding agent to a flange on the spout, a positioning device for positioning the spout in a predetermined relation to a spout applicator, a positioning device to position a carton with a hole provided in a predetermined relation to the spout applicator and for attaching the spout to the carton at the position where the heated stem is deformed to mechanically engage the carton of the hole.

5 Claims, 10 Drawing Sheets

APPARATUS FOR ATTACHING A SPOUT TO A CARTON

This application is a division of Ser. No. 07/953,698 filed Sep. 30, 1992 now U.S. Pat. No. 5,338,385.

FIELD OF THE INVENTION

The present invention relates to methods and apparatuses for attaching objects such as spouts to objects such as planar portions of articles. More particularly, the present invention relates to methods of and apparatuses for attaching spouts to gable tops of paperboard cartons.

BACKGROUND AND SUMMARY OF THE PRESENT DISCLOSURE

Various apparatuses which form and fill gable top paperboard cartons are known in the prior art. For example, the Cherry-Burrell packaging machine, Model H-75, is a standard in the field. The Cherry-Burrell machine forms a paperboard carton having four sides and a bottom, partially folds the upper ends of the sides of the carton into a gable top, fills the carton, and completely folds and seals the gable top. The Cherry-Burrell machine operates continuously in an assembly line-type manner, such that cartons are formed and filled one by one in the machine at sequential stations, each of which performs a small task on the carton in under one second, before the carton moves on to the next station. The Cherry-Burrell machine is mentioned as an example only. Other manufacturers also provide form and fill machines which could be utilized to form a carton with a gable top.

Gable top cartons of this type, though, have disadvantages when they are used to store and dispense liquid products such as milk, juice, etc. Specifically, the gable top can often be difficult to open correctly without accidentally tearing the carton, and, when the top is reclosed, it fails to provide a liquid-tight closure and thus allows spillage of the liquid if the carton is shaken or accidentally tipped over.

Accordingly, it has become desirable to place a resealable closure on a sloping side of the gable top as a substitute for opening the gable top, wherein the closure is more easily opened and is liquid-tight when reclosed. For example, U.S. Pat. No. 4,669,640 to Ando et al. discloses a method of attaching a mouthpiece 34 to a gable top carton 20, wherein the mouthpiece is pushed through an aperture 32 in a sloping side 28 of the gable top carton 20 such that the mouthpiece 34 is held to the side 28 by a flange 46 and retainer lugs 48 of the mouthpiece 34, and wherein the flange 46 is then thermally or ultrasonically fused to the side 28.

U.S. Pat. No. 4,813,578 to Gordon et al. also discloses a method of attaching a pour spout 40 to a gable top carton 10, wherein the spout 40 is first placed on the open gable top such that a flange 46 overlies an opening 30 in the gable top, and wherein the flange 46 is then heated and pressed into contact with the gable top such that the flange 46 adheres to the gable top.

Further, U.S. Pat. No. 4,909,434 to Jones et al. discloses a method of securing a pouring spout 1 to a sloping side 2 of a gable top carton, wherein a hole is first cut in the sloping side 2, wherein the spout 1 is then inserted into the hole such that a flange 6 thereof extends around the hole, wherein a skirt section 4 of the spout 1 is then heated to bend and form a second flange around an opposite side of the hole, and wherein both of the flanges are heated to bond and seal with the material of the side 2.

The above methods of attaching spouts to gable top containers have the disadvantages, among others, that they are complex and susceptible to accidental removal of the installed spout or they employ thermal or ultrasonic devices to bond a spout to a container. Such methods are accordingly relatively expensive, and, in the case of thermal or ultrasonic bonding, may be difficult to integrate into the operation of a packaging machine.

In view of the above, it is an object of the present invention to provide a method and apparatus for attaching spouts to planar portions of articles such as containers.

It is also an object of the present invention to provide a method and apparatus for attaching spouts to planar portions of articles, which are readily integratable into a standard forming and fitting machine.

Another object of the present invention is to provide a method and apparatus for performing the steps of attaching spouts to planar portions of articles with highly accurate repeated horizontal and vertical positioning of the articles and the spouts.

Another object of the present invention is to provide a method and apparatus for positioning and manipulating a spout for the application of bonding agent so that bonding agent is applied quickly and uniformly about a periphery of the spout.

Yet another object of the present invention is to provide a method and apparatus for conveying spouts from a storage source to sequential stations where a bonding site is prepared and the spouts are attached that is fast, reliable and accurate.

A further object of the present invention is to provide a method and apparatus for attaching spouts to planar portions of articles which are readily integratable in a standard form and filling machine and which interrupt the operation of the standard machine as little as possible.

The above objects as well as other objects not specifically enumerated are accomplished by a method of attaching a spout to a planar portion of an article in accordance with the present invention.

In one aspect of the present invention, the method includes the steps of moving the article successively to at least two stations of a conveyor line, positioning an edge portion of the planar portion at a first predetermined position relative to a hole punch at a first article station, punching a hole through the planar portion at the first station, positioning a spout at a first predetermined position relative to a bonding agent applicating station, applying a bonding agent to the spout, positioning the prepared spout at a second predetermined position relative to a spout applicator station, positioning the edge portion of the article at a second predetermined position relative to the spout applicator at a second article station, and attaching the spout to the planar portion about the hole at the second station.

The objects of the invention are also accomplished by an apparatus for attaching a spout to a planar portion of an article. The apparatus includes a hole punch, a first article positioning means having a first positioning surface thereon located in a first predetermined position relative to the hole punch for positioning the article relative to the hole punch, a bonding site preparer, a first spout positioning means located in a predetermined position relative to the bonding site preparer for positioning the spout relative to the bonding site preparer, a spout applicator, a second article positioning means having a second positioning surface thereon located in a second predetermined position relative to the spout applicator for positioning the article relative to the spout applicator, and a second spout positioning means located in a predetermined position relative to the spout applicator.

In another aspect of the present invention, the apparatus includes punching means for punching a hole, wherein the punching means punches along a central punching axis. A first article positioning means for positioning an edge portion of the planar portion is provided, which first positioning means is spaced from the punching axis by a predetermined distance. A second article positioning means for positioning the edge portion of the planar portion is provided, wherein the second article positioning means is spaced from the attaching axis by the same predetermined distance. This feature ensures that the spout attaching means is precisely aligned with the hole that has been punched in the article. A bonding agent applying means, for applying bonding agent in a circle about a central spout applying axis, is associated with a first spout positioning means for positioning the central axis of the spout. Further, a spout attaching means for attaching a spout is provided such that the spout attaching means has a central attaching axis. A second spout positioning means for positioning the spout relative to the spout applicator is also provided.

The present invention also relates to an apparatus for attaching a spout to a gable top of a paperboard carton, which includes a spout applicator mounted for translation along a spout applying axis, an article positioning means including a substantially horizontal positioning surface spaced from the spout applying axis by a predetermined axis, an article lifting means, which includes a clamp for clamping an edge portion of the article and a means for raising the clamped article, a spout conveying means, which includes an air conveyor and a gravity track, a first spout positioning means, a glue applicator associated with the spout positioning means, and a spout lifting means which lifts a spout from the track and rotates it about a gluing axis a predetermined distance from the glue applicator, and a second spout positioning means including a vertical spout feeding means which feeds spouts to the spout applicating means in a predetermined orientation. This aspect of the present invention also includes a suction cup connected to a source of suction beneath the first spout positioning means.

The present invention also relates to a method of positioning a planar portion of an article, which includes the steps of moving the article relative to a positioning means via moving means. The planar portion of the article is guided between a pair of restraining surfaces of the positioning means, while an edge portion of the planar portion is positioned against a positioning surface of the positioning means.

BRIEF DESCRIPTION OF THE DRAWING FIGURES

The objects and advantages of the present invention will become apparent from the following detailed description of the preferred embodiment thereof in connection with the accompanying drawings in which like numerals designate like elements, and in which.

DETAILED DESCRIPTION OF THE PREFERRED EMBODIMENT

Figure 1:
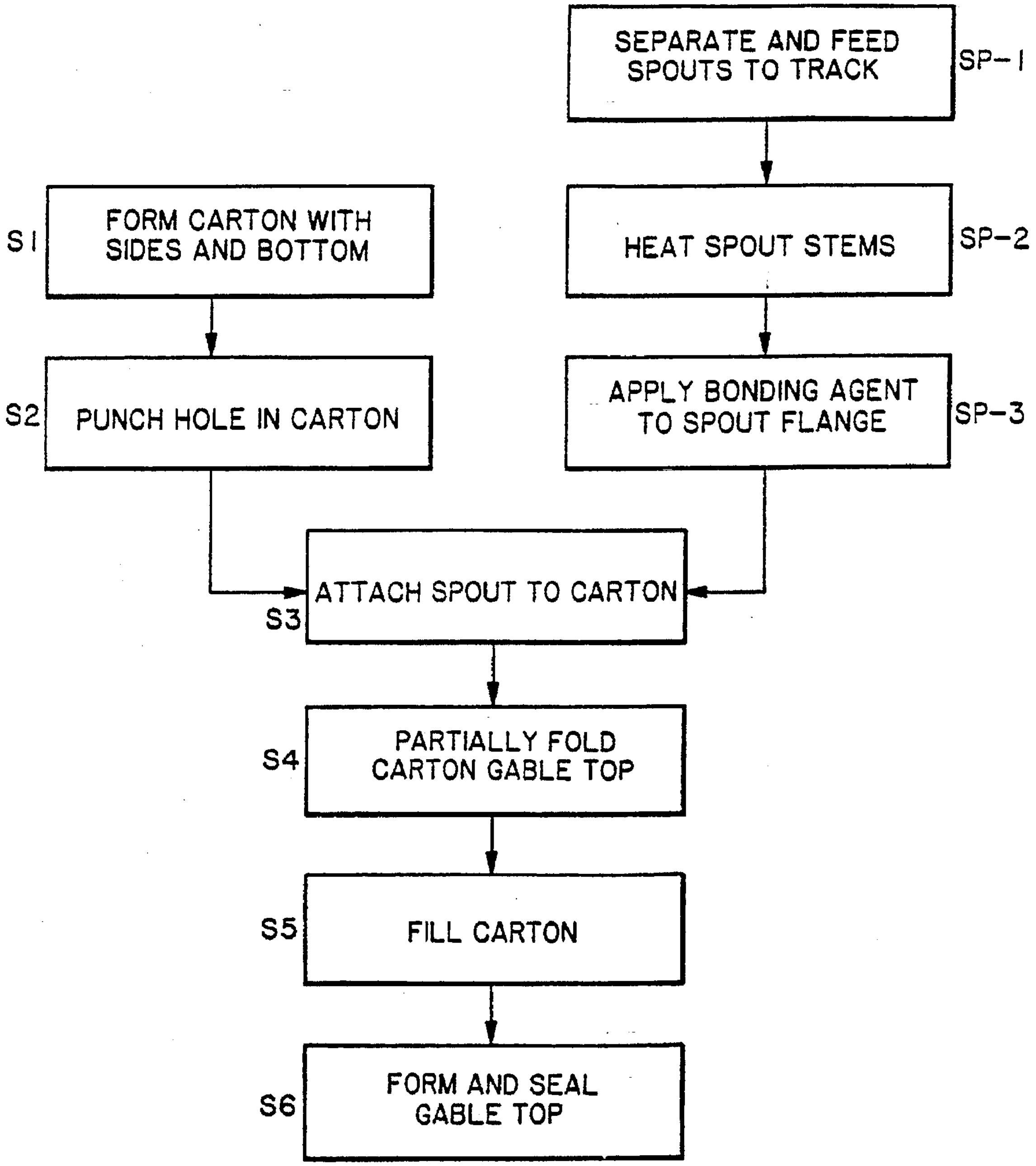
FIG. 1 is a flow diagram generally showing the sequence of steps in a carton forming and filling machine which includes the method of applying a spout to a carton of the present invention.

With reference to FIGS. 1 to 11, a method of and apparatus for attaching a spout to a planar portion of an article such as a gable top of a paperboard carton will be described. The method and apparatus of the present invention can be integrated into an overall carton forming and filling process as described in copending, commonly assigned patent application Ser. No. 07/657,994. Application Ser. No. 07/657,994 discloses a method for attaching a spout to a planar portion of an article which comprises methods for positioning an article at successive stations, punching a hole in the article and attaching a spout in the punched hole. Commonly assigned patent application Ser. No. 07/801,896 discloses a method and apparatus for securing a spout to a planar portion of an article such as a paperboard carton, which comprises a means for deforming a portion of the spout which extends through the carton wall back against the carton to produce a mechanical engagement between the spout and the carton. A suitable spout for use in the method and apparatus of the present invention is disclosed in commonly owned U.S. patent application Ser. No. 07/753,855. The disclosures of the above-identified commonly owned applications are incorporated herein by reference.

The apparatus of the present invention can utilize one or more of the features of the above-identified applications as appropriate. However, the present invention is not limited to use with any of those features. The method and apparatus of the present invention can be integrated into an existing carton forming and filling process and apparatus. As seen in the FIG. 1, certain preparatory steps are performed on separate paths on the spouts and the cartons. These steps are not necessarily performed simultaneously or in the illustrated sequence. However, the apparatus of the present invention provides a ready supply of spouts and cartons available for the spout attaching step.

According to one sequence of operation, a carton is partially formed with sides and bottom which is shown as step S-1. At this stage the portions of the carton which will be folded to form the gable top are straight extensions of the sides. The partially formed carton may be moved to a hole punch station where a hole is punched in the carton side to accept a spout at a location on the carton which will become part of the gable top, shown as step S-2. Alternatively, as mentioned, the carton stock may be provided with a hole at the spout location and accordingly, step S2 would be performed previously by a suitable apparatus (not shown).

At substantially the same time as the carton is being formed, the spouts which will ultimately be attached to the cartons are separated and fed in a predetermined orientation to a spout conveying apparatus in step P-1. In a preferred embodiment of the invention, the spouts pass under a heating element in step P-2 which heats a stem portion of the spouts to facilitate bonding site preparation and deformation of the stem portion which occurs as part of the attaching step, described below. In step P-3 a bonding site is prepared by applying a bonding agent to the spouts.

In step S-3 the spout is inserted into the hole in the carton side so that the bonding agent bonds the spout to the carton. In a preferred embodiment of the invention, the stem of the spouts, which are thin-walled and have been softened by heat applied in step P-2 are deformed during the insertion procedure so that the spout stem is bent back to mechanically engage the inside of the carton as described in the aforementioned U.S. patent application Ser. No. 07/801,896.

The carton is then acted upon by the forming and filling apparatus in step S-4 where the carton top sides are further folded to form a gable top. In step S-5 the carton is filled with a liquid such as milk or juice, and in step S-7 the gable top is finished and sealed in a conventional manner.

To facilitate the description of the present invention, general physical characteristics of the spout should be understood. Referring to spouts illustrated in FIGS. 6 and 7, a spout 4, which as mentioned is preferably the spout disclosed in commonly assigned U.S. patent application Ser. No. 07/753,855, is generally circular cylindrically shaped, open at one end, which end is herein referred to as the stem 5, and having at the opposing end a cap closure 6. A flange 7 extends radially outward from about the center of the spout.

Figure 2:
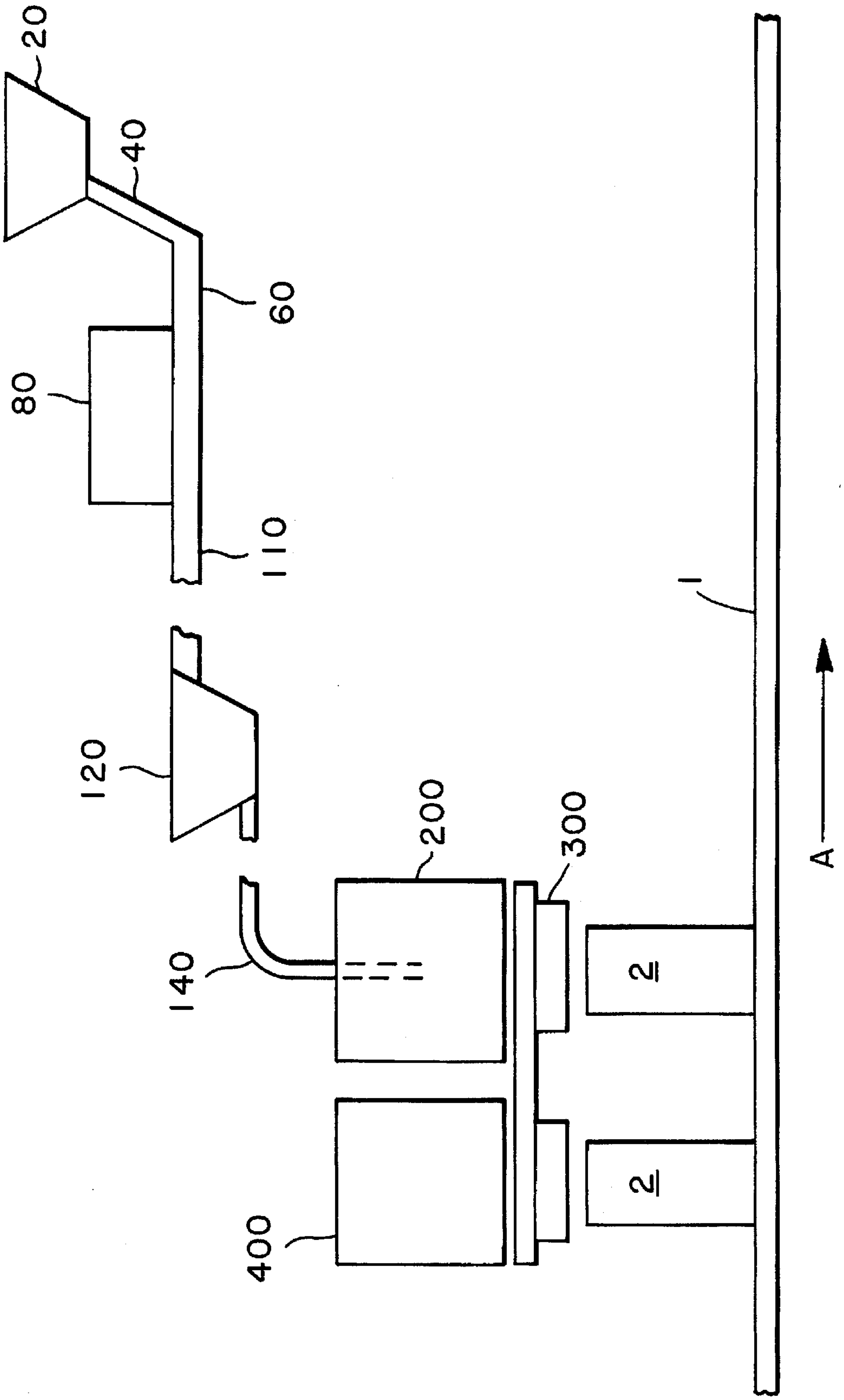
FIG. 2 is a schematic diagram of the apparatus of the present invention which generally illustrates the physical relationship among the elements of the invention.

FIG. 2 is a general schematic of the apparatus of the present invention showing the general positional relationship among the components of the apparatus, which, as may be understood from the description of FIG. 1, may be remote from one another. In FIG. 2 a carton conveyor 1 is shown generally, with the direction of movement of the cartons indicated by an arrow A below the conveyor. For clarity, the conventional elements of the carton form and filling apparatus are not illustrated, but should be understood to be appropriately positioned along the carton conveyor path 1 as is known in the art. The carton conveyor 1 moves cartons 2 in predetermined steps of a discrete distance and stops the cartons for a predetermined time at each step. These steps correspond to the sequential stations of the forming and filling apparatus, which were generally described in connection with FIG. 1, and the steps of the method of the present invention, which will be described in more detail below.

After a carton is partially formed to have four sides and a sealed bottom, as indicated in FIG. 2 the conveyor 1 moves the carton 2 to a first station. This first station may be a hole punch station 400 as shown in FIG. 2. The carton 2 is placed in alignment with a carton lift 300. The carton lift 300 is shown as a single apparatus with parts under each of the hole punch station 400 and a next station 200. A first part of the carton lift 300 lifts the carton 2 from the conveyor 1 where the carton is positioned in relation to the hole punch means 400. A hole is punched at a predetermined position in the carton 2, afterwhich the lift 300 returns the carton to the conveyor 1. Alternatively, the carton 2 can be previously provided with a prepositioned hole and this step and corresponding apparatus may be omitted.

Figure 11:
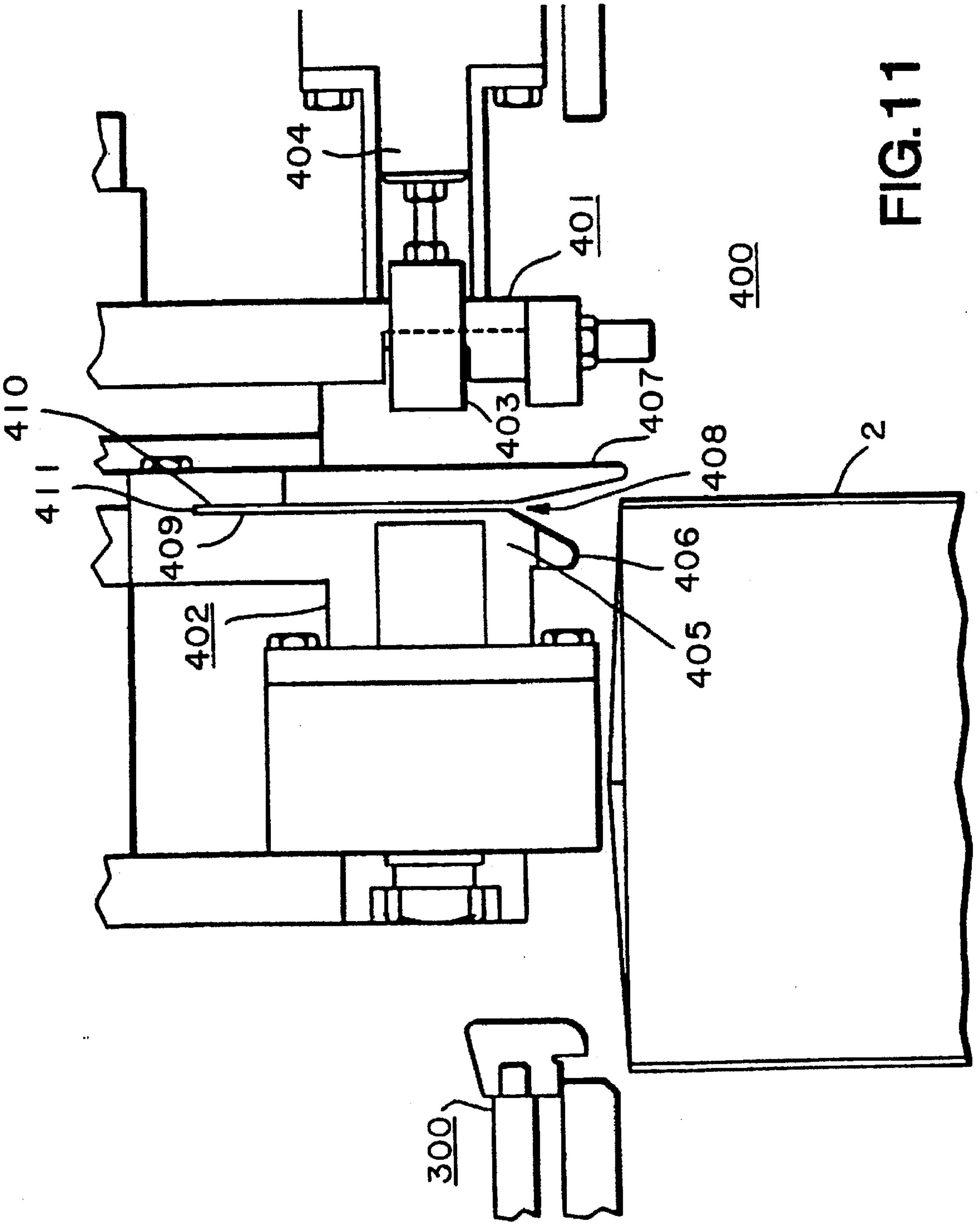
FIG. 11 is a partial side view of a hole punch apparatus of the present invention.

The carton 2 having a hole then moves to a spout applicator station 200, where a second part of the carton lift 300 engages an upper edge portion of the carton by grasping the edge from above. The lift 300 then raises the carton 2 from the conveyor 1 to the spout applicator apparatus 200 and holds the carton in position while a spout is attached to the hole. (FIG. 11). The carton 2 is lowered from the spout applicator station 200 to the conveyor 1, which moves it to the next step in the form and filling apparatus.

Figure 7:
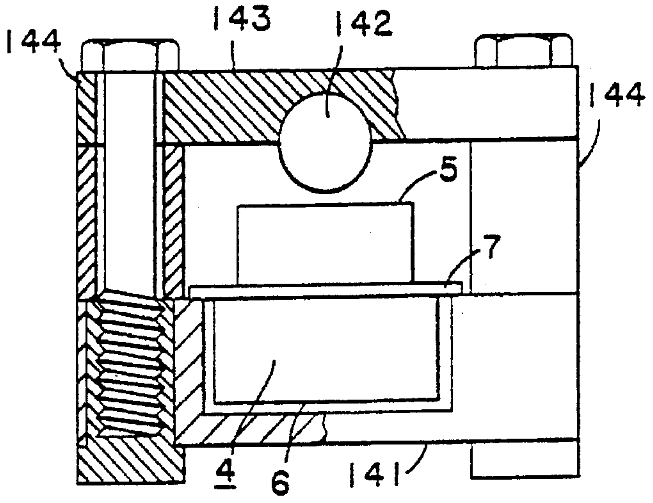
FIG. 7 is a view taken along lines A—A of FIG. 6.
Figure 6:
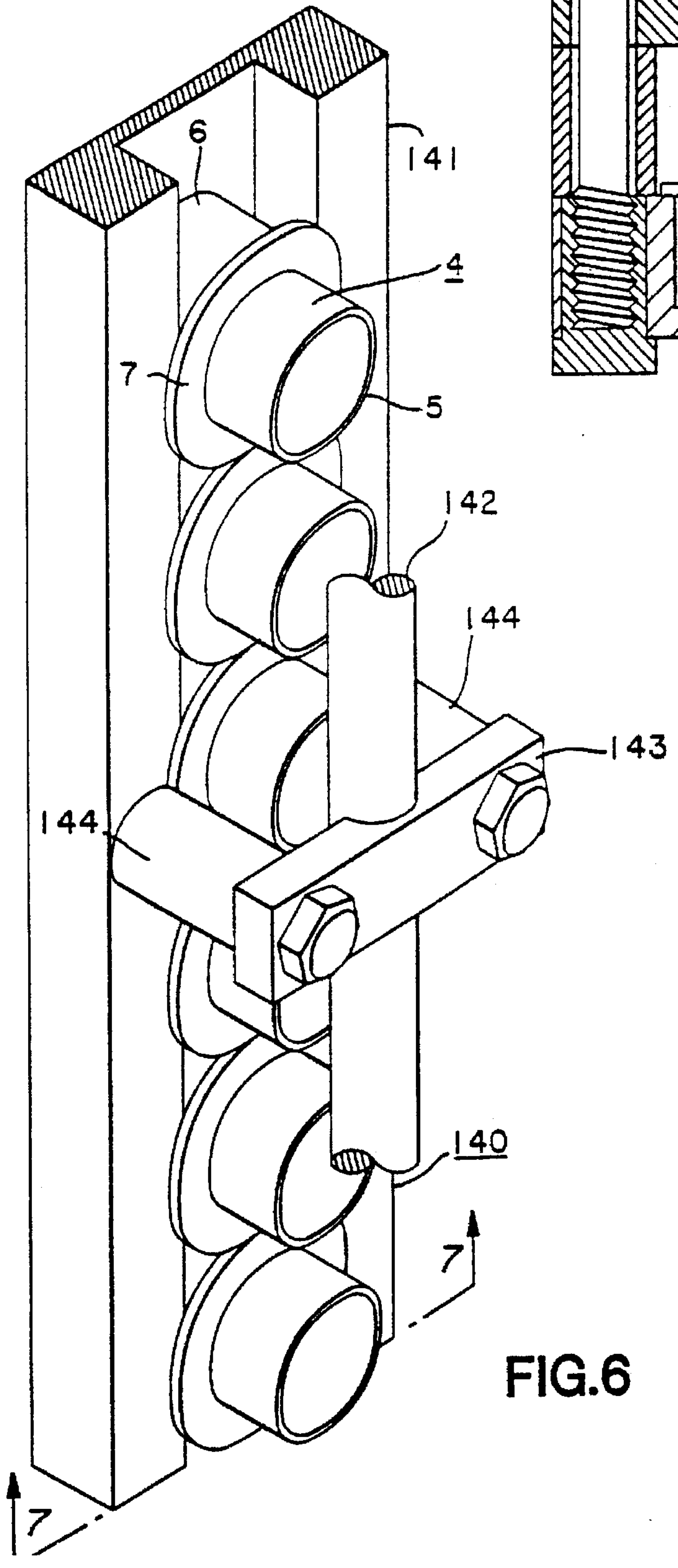
FIG. 6 is a partial oblique view of a gravity track of the present invention.

The spouts are provided to the spout attaching station as generally shown. Spouts in a supply hopper 20 are separated and positioned for bonding preparation on a vibratory track means 40. The supply hopper 20 and vibratory track 40 are conventional elements known to the art. The vibratory track 40 conveys the spouts to a heater 60 (FIG. 3) where, as mentioned above, a stem portion of the spout is heated. The heated spouts move on the track 40 to the bonding preparation station 80 (FIG. 4). In a preferred embodiment, the bonding preparation station applies a bonding agent to the spout. An air conveyor 110 moves the prepared spouts from the bonding agent applicator 80 to a second hopper 120, which acts as a reservoir of prepared spouts for feeding to the spout attaching apparatus 200. Spouts move from the second hopper 120 to the spout applicator 200 via a gravity track device 140 (FIGS. 6 and 7).

Having described the method and apparatus in general terms, the stations will now be described in greater detail, beginning first with the spout preparation and conveying apparatuses.

Figure 3:
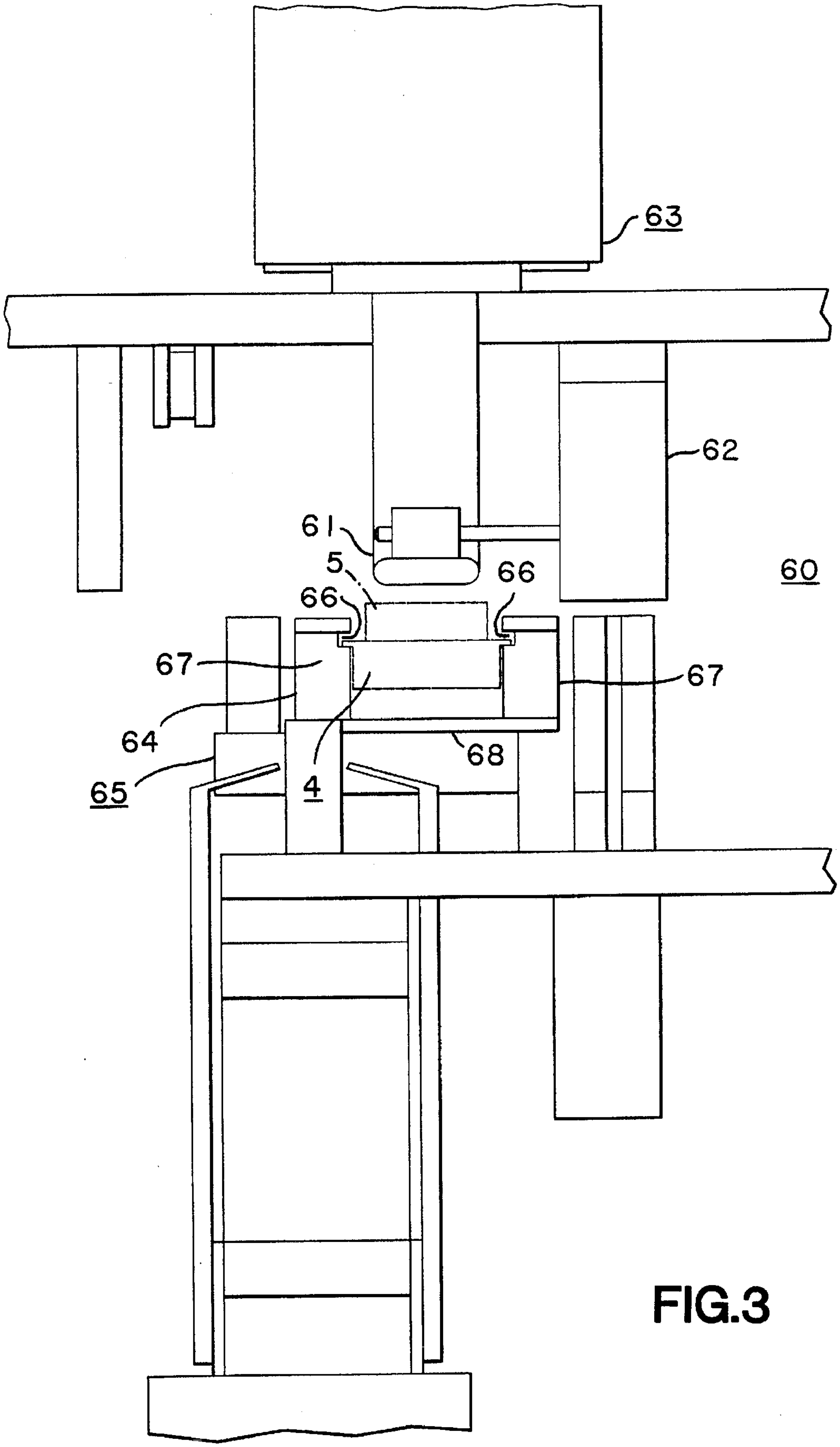
FIG. 3 is an end view of a spout heater of the present invention.
Figure 4:
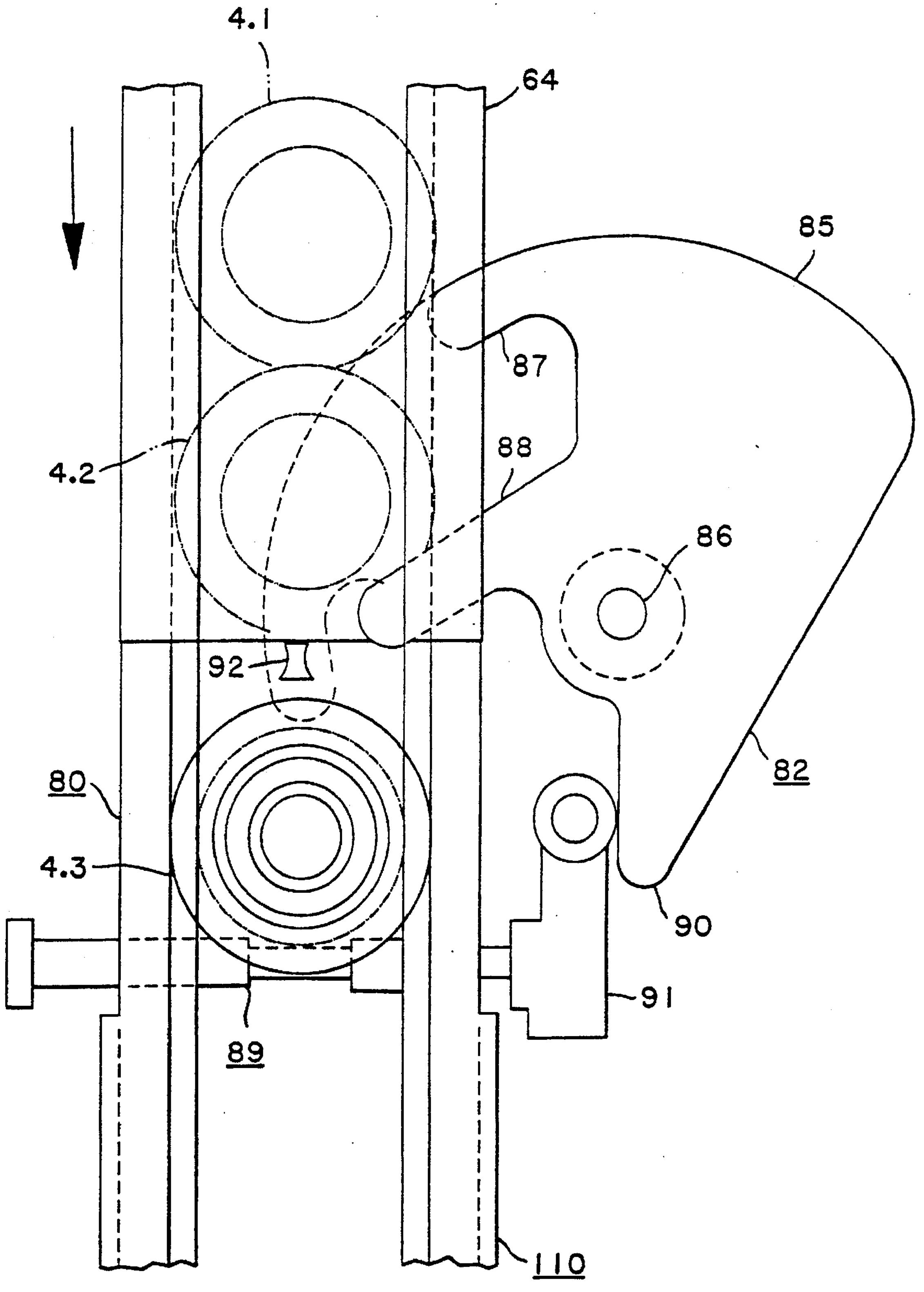
FIG. 4 is a top view of a bonding agent applicator of the present invention showing a spout feed apparatus.

FIG. 3 shows an end view of a spout heater apparatus 60 of the present invention. A heating element 61 is supported above the track 64 by an upper frame element 63. The heating element 61 is connected to a source of heat energy 62. The track means 64 is supported below by a lower frame member 65. The track means 64 is generally U-shaped, having two upward extending legs 67 supported on a bottom surface 68. The track means 64 provides both supporting and guide means to carry the spouts 4 to and through the heater station with the stems 5 oriented upward as shown and at a predetermined distance to permit heat transfer between the heating element 61 and the stems. The distance is selected so that energy from the heating element 61 is focussed on the stem portion 5 of the spout 4. Alternatively, the spouts 4 may be stopped under the heating element 61 for a predetermined time and the heating element lowered to provide heat to the spout stem 5. As shown in FIG. 3, the track means 64 has two horizontal opposed slots 66 in the upwardly extending legs 67. These slots 66 act to constrain movement of the spouts 4 to the track 64 and prevent spouts from leaving the track. In the present embodiment, a vibratory motive means (not shown) is provided to move the spouts 4 from the hopper 120 to the heater 60 and then on to a bonding agent applicator. Alternatively, the motive means may be provided by forced air jets, gravity, or other like means.

A spout 4 travelling on the track 64 is placed in heat transfer relation with the heating element at a distance which allows the energy from the heating element 61 to soften the spout stem 5. The spout 4 has been positioned on the track 64 by conventional means (not shown) so that the stem 5, which will be inserted into a hole in the carton, is facing upward as shown in FIG. 3. Heating element 61 may be any convenient heat emitter, such as a high intensity lamp or hot air stream. The heating element 61 must be capable of controlling the rate of heat transfer to the spout stem 5 and to localize heat exposure to the stem of the spout. In a preferred embodiment, spouts 4 do not stop under the heating elements 61, but the track motive means (not shown) moves the spouts through the heating station at a speed which allows sufficient heating of the stems to facilitate the deformation in the spout attaching step. However, the conveying action could be slowed or stepped to ensure proper heating of the spout stems.

In an alternative embodiment of the invention the heating step is omitted by use of a spout having a stem wall provided with a notch to facilitate deformation as disclosed in the aforementioned commonly owned U.S. patent application Ser. No. 07/753,855.

The spout heating means 60 is shown in FIG. 2 as located immediately before the bonding agent applicator 80. The heater means 60, however, may be conveniently located after the bonding agent applicator 80 and anywhere before the spout applicator means 200 in order to heat and soften the spout stems before the spout applicating step.

FIG. 4 is a top view of a spout feeder apparatus which is associated with the bonding agent applicator 80 shown in FIG. 2. For clarity, the bonding preparation apparatus 80, is not shown in FIG. 4. The track means 64, which is essentially horizontal at this station, leads from the heater apparatus 60, described above, to the bonding agent applicator 80. Spouts 4.1 and 4.2 move along the track means in the direction of the arrow B first to the spout feed device 82.

The spout feed 82 comprises an escapement 85, which is reciprocally rotated by a rotation means (not shown) about an axis 86 into the track path, and a gate 89. The escapement includes two spaced, fingers, first finger 87 and second finger 88, extending from the escapement body. The escapement 85 rotates into the track 64, and the fingers 87, 88 separate a spout 4.2 from the stream of spouts in the track and guide it to the bonding agent applicator 80. The gate 89 then stops the spout 4.3 at the precise station location. In the position shown by solid lines in FIG. 4, the spout 4.3 is in position for the bonding agent applicator 80. The second finger 88 prevents the next in line spout 4.2 from entering the station at this time and the gate 89 is in an open position. When the escapement 85 rotates counter-clockwise into the track path, the first finger 87 urges the next in line spout 4.2 toward the station and closes the track 64 to upstream spout 4.1, as the second finger 88 rotates out of the track path to allow the next in line spout 4.2 to move toward the station. The gate 89, which is located on the immediate downstream side of the bonding agent applicator 80, positions the fed spout in the agent applicator. A cam 90 is located on the escapement 85 and actuates a follower 91 of the gate 89. As the escapement 85 rotates counter-clockwise, the follower 91 moves to the right as shown in FIG. 4, which closes the gate 89. The gate 89, located on the immediate downstream side of bonding agent applicator 80, prevents movement of the spout 4.3 past the agent applicator.

When the escapement 85 rotation is complete, which is indicated by the position in broken lines, the fed spout is captured between the first finger 87 and the gate 89 in precise position for the bonding agent applicator 80. Once the spout is in position, referring to spout 4.3 in FIG. 4, the escapement 85 is rotated clockwise out of the track path 64, the first finger 87 is cleared from the path allowing a next in line spout to be captured by the second finger 88. As the cam 90 moves to the left in the figure, the follower 91 causes the gate 89 to open. The positioned spout 4.3 is retained in the spout applicator 80 by the activation of a bonding preparation apparatus suction cup, as described below.

After the bonding agent applicator 80 has prepared the spout, as described below in connection with FIG. 5, an air jet 92, connected to a source of compressed air (not shown), and directed parallel to the track path, provides a burst of air to move the prepared spout out of the bonding agent applicator 80 and along an air conveyor means 110 to the second spout hopper 120. The gate 89 is open at this time. The spout feed sequence is repeated with counter-clockwise rotation of the escapement 85 as described above.

Figure 5:
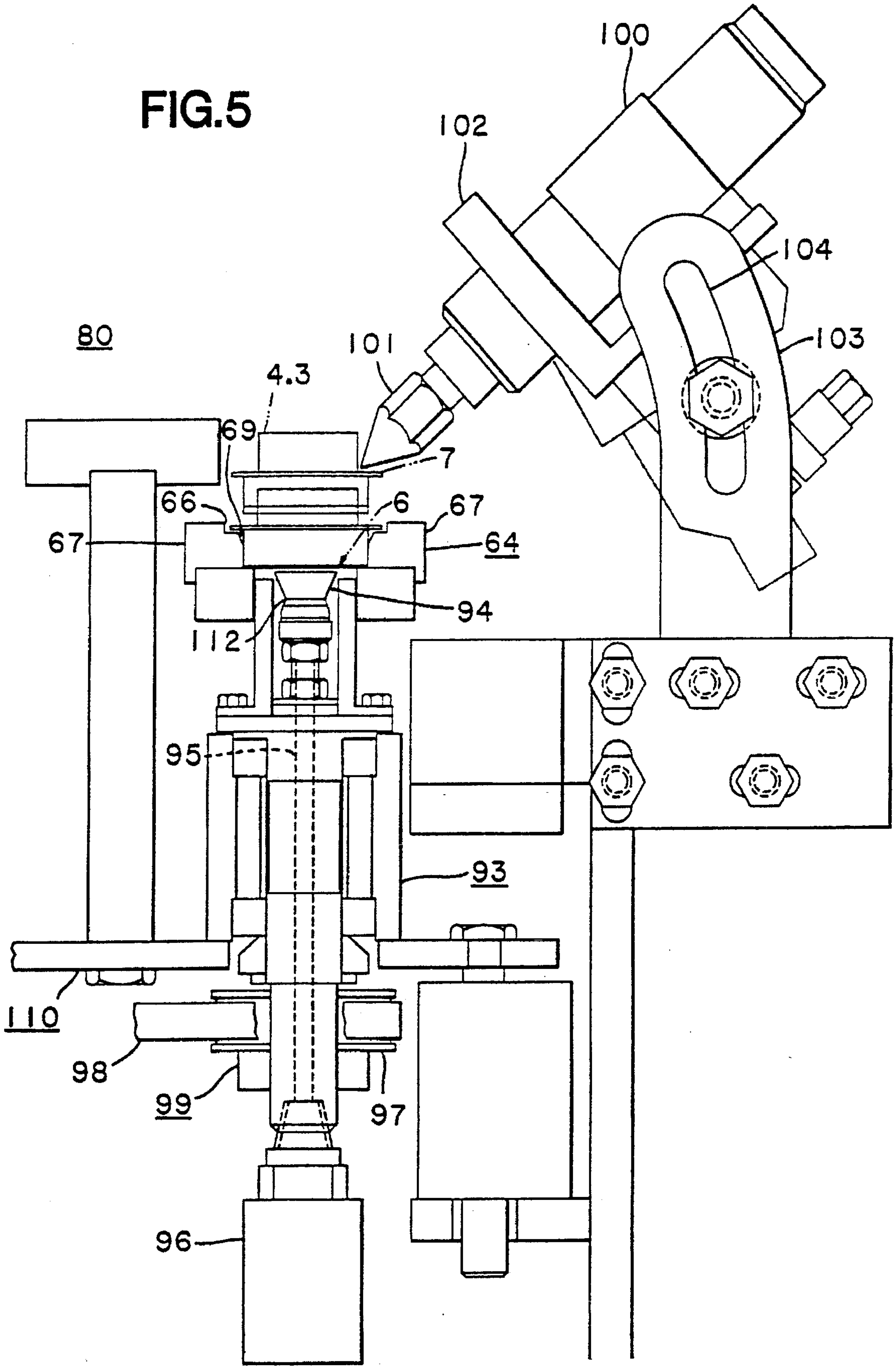
FIG. 5 is a partial cross-sectional front view of a bonding agent applicator of the present invention.

FIG. 5 shows an elevation view in partial section of the bonding agent applicator 80. In a preferred embodiment described below, the bonding agent applicator 80 is a bonding agent applicator which applies a bonding agent to the spout flange 7 (See FIG. 6). For clarity the spout feed apparatus 82 described in connection with FIG. 4 is not illustrated in FIG. 5.

A spout 4.3 positioned by the spout feed apparatus 82 rests in the track 64 immediately above a spout lift device 93. A spout lift 93 is positioned below the track 64 at the spout feed location. The spout lift 93 is supported by frame elements 110, and is aligned with a gap 112 in the underside of the track 64. As seen in FIG. 5, the track constraint slots 66 described in connection with FIG. 3 are adapted to permit a spout to be lifted from the track 64. The upper portion of legs 67 (as shown in FIG. 3) are absent which opens the slot 66. In addition, a bevel 69 is provided on the inside edge of the track to assist in re-positioning a spout being lowered from the bonding agent applicator position to the track 64.

A suction cup 94 is mounted on a vertically extendable shaft 95 which is slidably mounted in an air cylinder 96. The suction cup 94 is positioned in the gap 112 in the track and below the spout position. The suction cup 94 is coupled to a suction source (not shown). The cylinder 96 is fixed on a pulley 97 which is rotatably mounted on an axle 99. The axle 99 is supported in a frame member 110. The pulley 97 is engaged via a conventional transmission means 98, such as a belt or a chain, to a rotation drive means (not shown). The shaft 95 defines an axis of rotation which is perpendicular to the track 64.

Mounted above the spout lift 93 is a bonding agent applicating gun 100. The gun 100 is mounted so that a gun tip 101 is positioned above the suction cup 94 a predetermined distance from the axis of rotation. The distance is determined according to the dimensions of the spout so that bonding agent may be applied to the desired location of the spout. A mounting bracket 103 is provided with an adjusting groove 104 to allow adjustment of the gun position to be made so that the tip position may be set for any of a variety of spouts. The gun 100 is connected to a source of bonding agent (not shown) which is at high pressure, for example 5000 p.s.i. The bonding agent may be an adhesive, such as glue, or a chemical for an operation such as chemical etching and is caused to flow from the tip under pressure.

In operation, after a spout has been positioned on the lift apparatus 93 the vacuum source (not shown) draws a vacuum in the suction cup 94. The cylinder 96 extends the shaft 95 upward so that the suction cup 94 contacts a cap 6 of the spout, which adheres to the suction cup by means of the vacuum. The shaft 95 continues to extend upward until the spout flange 7 is positioned immediately below the gun tip 101.

After the spout 5 is lifted, the rotation drive means (not shown) is engaged and drives the pulley 97 which causes the lift 93, and thus the spout 5, to rotate. Alternatively, the rotation may begin as the shaft 95 extends upward, advantageously allowing the spout to accelerate to constant speed as it reaches the gun tip 101.

In a preferred embodiment, the drive means (not shown) executes two full rotations allowing one-half rotation for acceleration and one-half rotation for deceleration, thus providing at least one full rotation at constant speed. During at least one full rotation of the spout at constant speed, bonding agent is forced through the tip 101 of the gun and applied to the flange 7. Bonding agent is thus advantageously applied after the spout has accelerated to constant rotational speed to ensure that bonding agent is applied in a relatively uniform manner about the circumference of the flange 7.

After bonding agent has been applied, rotation of the shaft 95 decelerates, and the air cylinder 96 retracts the shaft and returns the prepared spout to the track 64 and the vacuum is released. The bevel edges 69 in the spout position in the track 64 facilitate the repositioning of the spout in the track. As described above, a jet of air from the air jet 92 moves the prepared spout out of the bonding agent applicator 80 and along the track to the second hopper.

Prepared spouts are moved from the bonding agent applicator 80 to a second hopper 120 by the air conveyor 110, as shown in FIG. 2. The second hopper 120 has a vibration means (not shown) to move the spouts therethrough. The second hopper 120 acts as a reservoir of prepared spouts which can then be fed to the spout applicator 200 (FIG. 8) at a rate coordinated with the supply rate of the cartons.

FIG. 6 shows a partial perspective view of the gravity track assembly 140 showing several spouts in the track. The gravity track 140, as shown in FIG. 2, leads from the second hopper 120 to the spout applicator apparatus 200. FIG. 7 is a view taken along line A—A of FIG. 6. As shown in FIGS. 6 and 7, the gravity track 140 comprises a lower U-shaped member 141 and an upper rod member 142 spaced therefrom. The rod 142 is supported above the U-shaped member 141 by a series of cross ties 143 supported on posts 144 located along the track and fastened perpendicular to the track. The rod 142 retains the spouts in the track 140 and prevents a spout being carried in the gravity track from falling out. The entrance to the gravity track 140, which in the present embodiment is at the second hopper 120, is located above the exit of the track, which is located at the spout applicator 200, to utilize gravity as the driving means. The gravity track 140 enters the spout applicator apparatus 200 at nearly a vertical angle to align the spouts with an applicator ram, as described below.

As the spouts are being prepared, the cartons are being acted on, referring again to FIGS. 1 and 2. The carton is moved to a spout applicator station 200 which inserts and attaches a spout at the hole. The spout applicator station 200 is located on the carton conveyor line and positioned above the conveyor 1. A carton lift means 300 is provided to raise the carton 2 at each station so that the object function may be performed.

Figure 8:
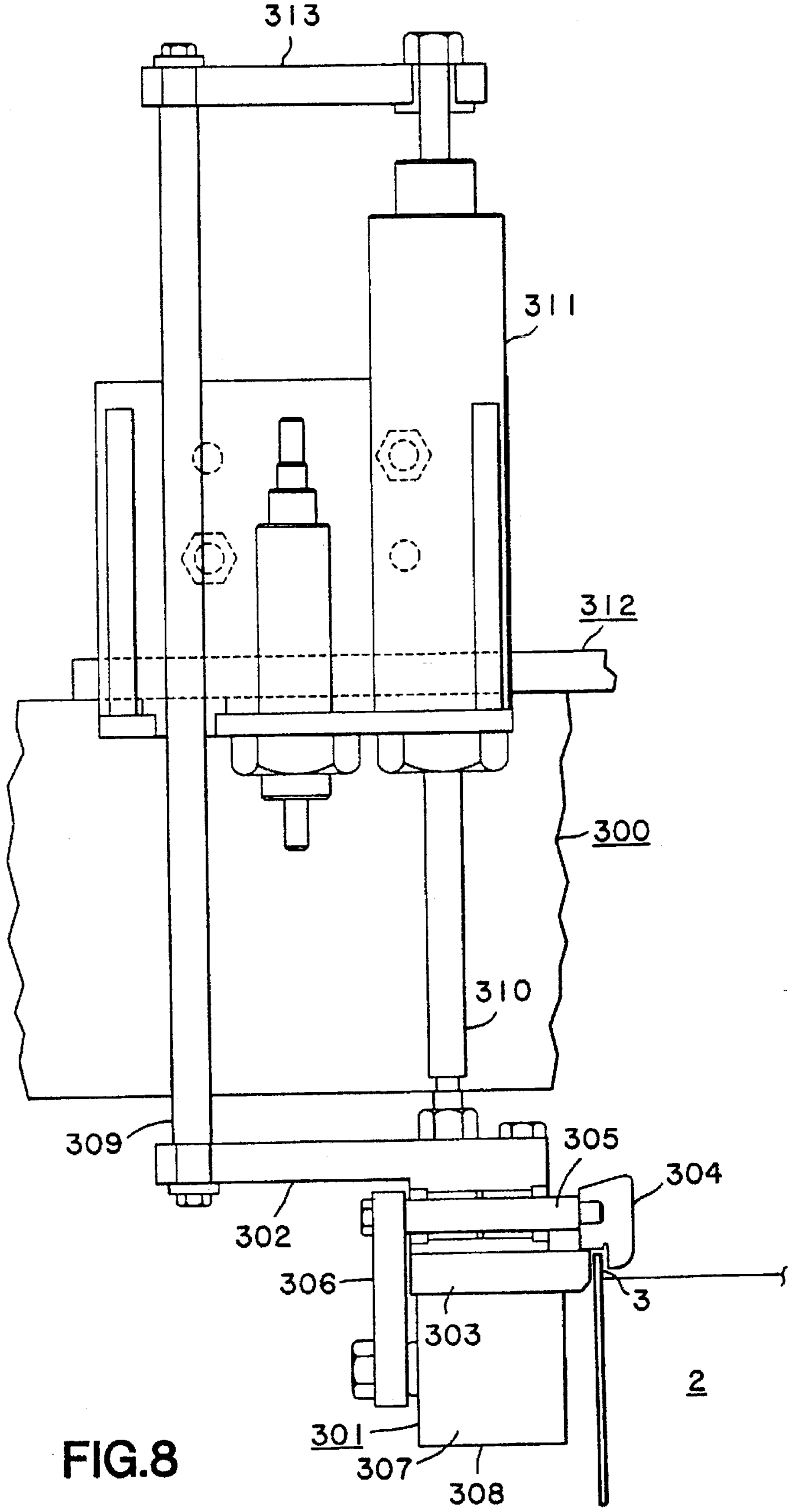
FIG. 8 is a side view of a carton lifter of the present invention.

FIG. 8 shows a partial cross-sectional end view of the carton lift 300. The view of FIG. 8 is from upstream of the hole punch and spout applicator stations and looks in the direction of the carton conveyor. A carton 4 moving on the conveyor 1 is positioned adjacent to the carton lift 300 so that an upper edge 3 of the carton side is aligned with carton lift apparatus 300. The side of the carton aligned with the carton lift 300 is opposite the side of the carton where the hole is punched. The carton lift 300 comprises a lift block 301 mounted on a lower frame element 302. Attached to the lift block 301 and extending horizontally therefrom toward the carton conveyor is a lift bar 303. The edge of the lift bar 303 provides a vertical surface at the upper edge 3 of the carton as shown. A clamp head 304 is fixed to a rod 305 which is slidably mounted in the lift block 301 above the lift bar 303. The clamp head 304 is generally L-shaped and has a vertical surface opposing the vertical surface of the lift bar 303 so that in a normally open position, the opposing vertical surfaces define an aligning space for the carton edge. A rod 305 is attached to an actuator 306. The actuator 306 is moved in a direction parallel to the longitudinal axis of the rod 305 by an actuator means 307 housed in a lift block housing 308. Movement of the rod 305 to the left in FIG. 8 causes the clamp head 304 and the bar 303 to close the aligning space and grasp between them the edge of the carton. The actuator means 307 may be typically a conventional means such as a solenoid or an air cylinder.

A lower frame element 302 is mounted to a frame bar 309 and a shaft 310. The shaft 310 is slidably mounted in an air cylinder 311, which is mounted in a support frame 312 above the lift block 301. The upper end of the frame bar 309 is coupled to the upper end of the shaft 310 by a plate 313. As may be seen in FIG. 8, the lower frame 302, frame bar 309, shaft 310 and plate 313 form a moveable structure which lifts the lift block 301 under action by the air cylinder 311.

Figure 9:
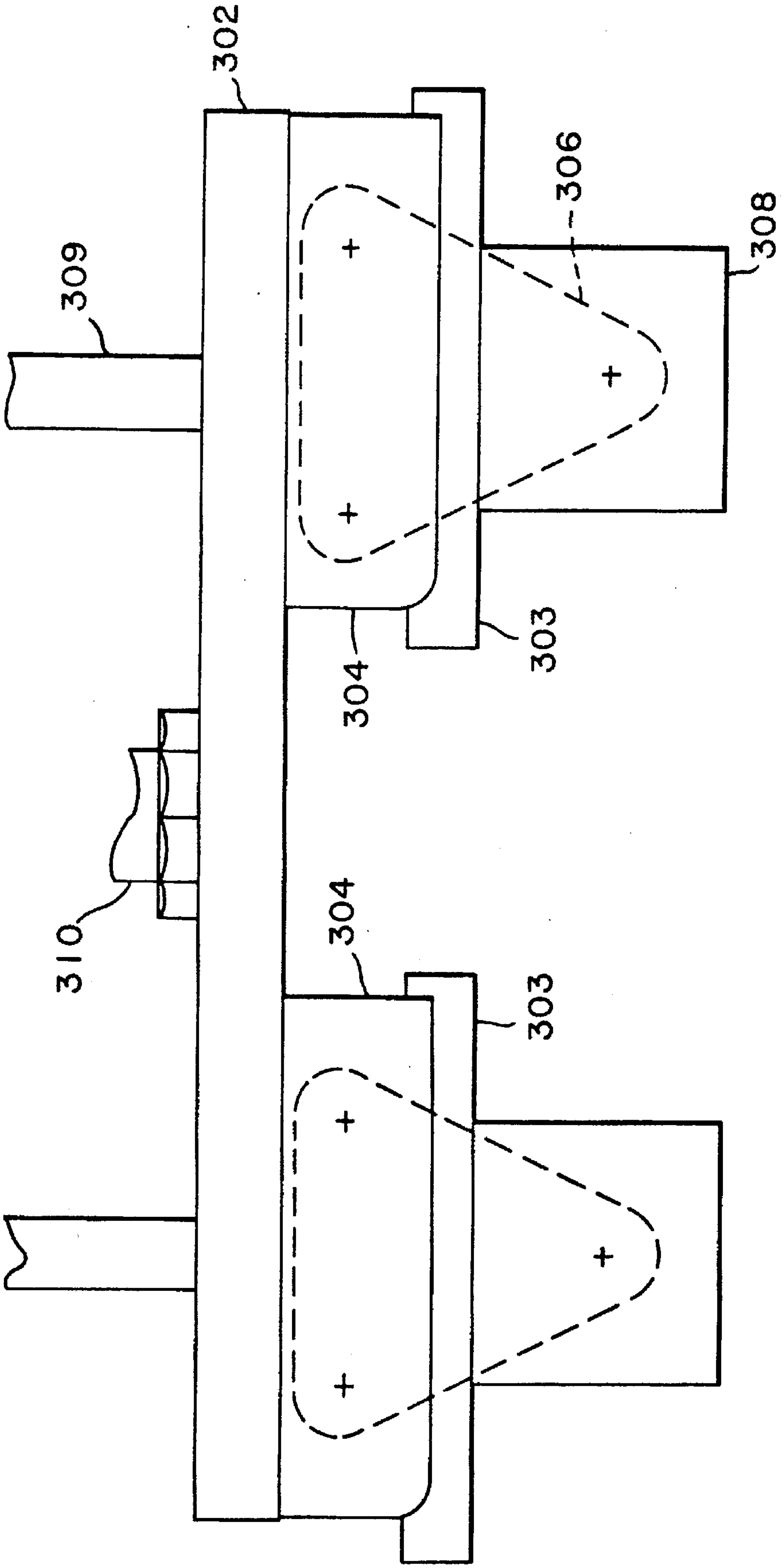
FIG. 9 is a front view of a carton lifter.

In one embodiment, the hole punch station 400 and the spout applicator station 200 are adjacently located and a single air cylinder 311 may be provided to operate a dual lift block station. FIG. 9 shows a front view of such a dual lift block assembly with like numbers indicating the same elements described in connection with FIG. 8.

Referring again to FIG. 8, in operation, a carton 2 is positioned so that the upper edge portion 3 is positioned between the clamp head 304 and the lift bar 303. The actuator means 307 urges the rod 305 rearward and the clamp head 304 clamps the carton edge to the lift bar 303. The cylinder 311 is activated and raises the lift block 301 to a predetermined height above the conveyor surface, which raises and positions the carton at the station. After the station function is performed on the carton, the cylinder 311 lowers the lift block 301 to return the carton to the conveyor, and the actuator 307 moves the rod 305 forward, releasing the carton edge from the clamping means 303, 304. The conveyor is then activated and moves the carton to the next station.

Figure 10:
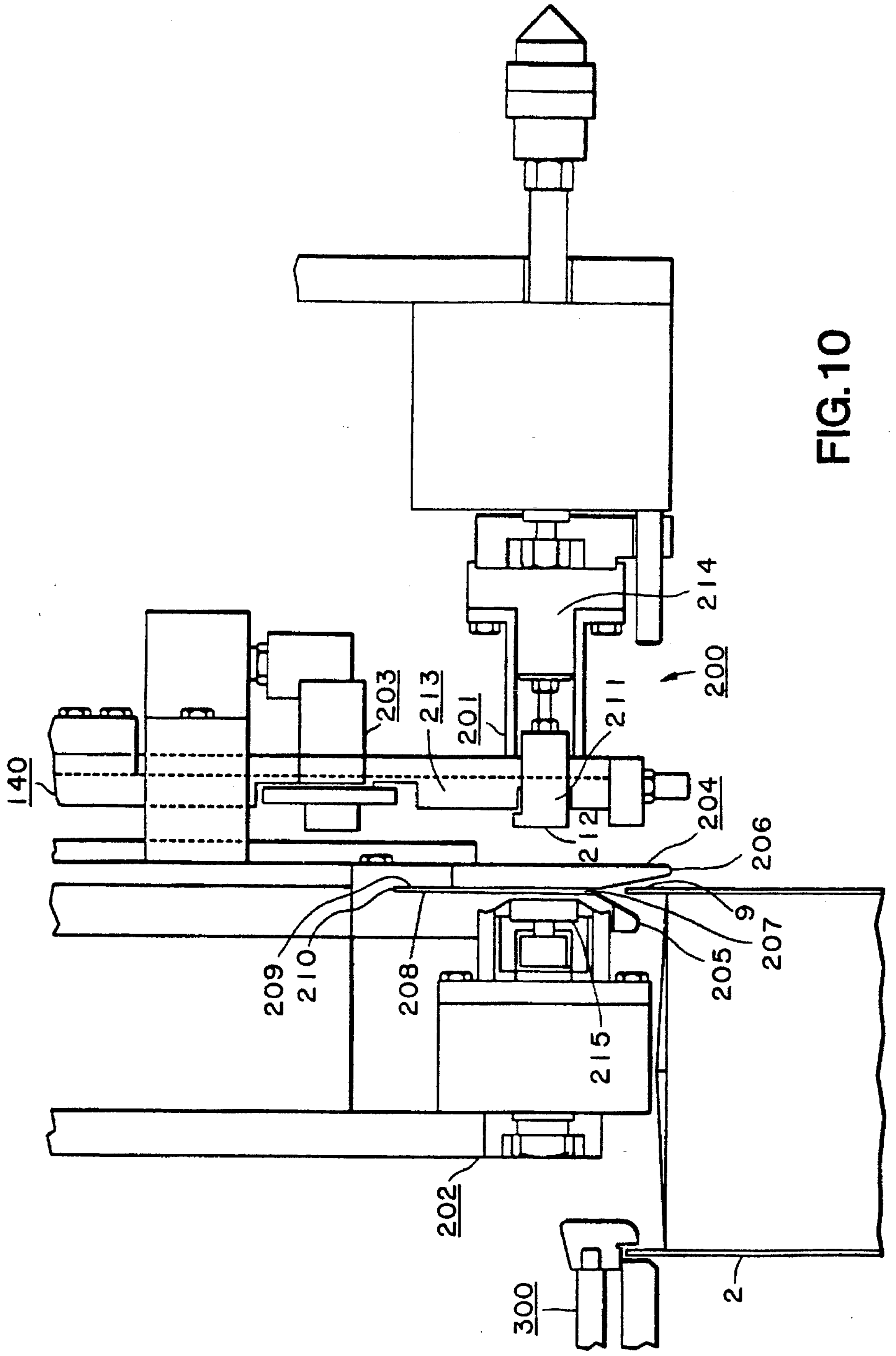
FIG. 10 is a partial cross-sectional side view of a spout attaching apparatus of the present invention.

FIG. 10 is a partial cross-sectional side view of the spout applicator station. The view of FIG. 10 is in the direction of the carton conveyor and looks from upstream toward the spout applicator. The carton conveyor (not shown) runs beneath the station and the carton lift 300 is positioned adjacent to and parallel to the station as indicated by the break-away representation. Spout applicator station 200 includes a spout attaching assembly 201, a positioning block 202 and a spout flow regulating mechanism 203. The positioning block 202 includes a guiding and positioning piece 204. The piece 204 is generally U-shaped, and includes a pair of downwardly projecting extensions 205, 206 which form a central slot 207. The central slot 207 is defined by a pair of substantially vertical spaced restraining surfaces 208, 209 on the inner facing surfaces of the downward extensions 205, 206 and a substantially horizontal positioning surface 210. The distance between the vertical surfaces 208, 209 is essentially equal to the thickness of the wall of a carton. Near the end of the extensions 205, 206, the vertical surfaces are angled from vertical, as shown in FIG. 10 to assist in capturing and aligning the edge of the carton as it is lifted from the conveyor into the positioning block.

The positioning block 202 effectively constrains the edge of the article and thus prevents upward or rotational movement of the article while the station function is performed. The carton lift 300, which clamps the opposite edge of the carton, prevents horizontal movement of the carton. The combined effect of the positioning block 202 and the lift 300 is to ensure that the article is held firmly while the spout is attached to the article.

The spout attaching station also includes spout attaching assembly 201. The construction and operation of the spout attaching assembly is described in detail in the aforementioned commonly owned U.S. patent application Ser. No.

07/801,896 which is incorporated herein by reference. As seen in FIG. 10, the spout attaching assembly 201 has a spout attaching ram 211 which is located opposite to the positioning block 202. A suction cup 212 is located at the head of the ram 211, and is coupled to a suction source (not shown). The ram 211 is connected to ram drive means 214 which moves the ram toward the positioning block 202. A supply passage 213 is located above the ram 211. The supply passage 213 extends upward in the figure and meets the gravity feed 140, which as described, supplies correctly oriented prepared spouts to the spout applicator station 200. Spouts are delivered by the gravity feed 140 to the supply passage 213 and slide downward to the flow regulating mechanism 203, situated above the ram 211, which drops spouts one by one to the bottom of the supply passage 213. The flow regulating mechanism 203 is described in detail in the aforementioned commonly owned U.S. patent application Ser. No. 07/657,994.

In operation, the carton conveyor 1 positions a carton 2 beneath the spout attaching station 200, as shown in FIG. 2. The carton lift 300 raises the carton as described above. The carton moves upwardly until an edge portion 9 of the carton is positioned vertically by positioning surface 210 and positioned horizontally by the pair of positioning surfaces 208, 209, which align a hole in the wall of the carton with the ram 211. The carton lift apparatus 300 travels a distance slightly greater than the distance necessary to move the edge portion of the carton to the horizontal positioning surface to ensure that the edge portion positively contacts the horizontal positioning surface 210. The carton may thus be pulled by the lift apparatus 300 slightly away from the ram 211 and against positioning surface 208, which assists in maintaining the carton side against the positioning block 202 while the spout is attached.

The spout is preferably attached to the carton in the method disclosed in the aforementioned commonly owned U.S. patent application Ser. No. 07/801,896, in which case the stem of the spout is deformed as the ram 211 forces it against an anvil 215 located in the positioning block 202 to form a mechanical engagement with the carton wall. Alternatively, the spout may be attached to the carton by the method disclosed in the aforementioned U.S. application Ser. No. 07/657,994. In this alternative embodiment, the spout is inserted in the carton hole, but not deformed, and it should be appreciated that the heating step and apparatus of the present invention thus may be omitted. After the spout is attached to the carton, the carton lift 300 lowers it to the conveyor 1 and the carton is released by the clamp 303, 304. The conveyor moves the carton to the next station.

FIG. 11 shows a side view of a hole punch station 400 of the present invention. As seen in FIG. 2, the hole punch station 400 is located upstream of the spout applicator station 200. In an alternative embodiment, carton blanks are provided with a hole in a predetermined location and this station is omitted.

Hole punch station 400 comprises a hole punch 401 and a positioning block 402. The construction and operation of the punching mechanisms of the hole punch station 400 is described in detail in the aforementioned U.S. patent application Ser. No. 07/657,994, and is incorporated herein by reference. The positioning block 402 construction and operation are identical to that for the spout applicator positioning block 202 and were described in more detail above in connection with FIG. 10. The hole punch 401 includes a punch ram 403 attached to a punch driving means 404. The positioning block 402 includes a guiding and positioning piece 405. The piece 405 is generally U-shaped, and includes a pair of downwardly projecting extensions 406, 407 which form a central slot 408. The central slot 408 is defined by a pair of substantially vertical spaced restraining surfaces 409, 410 on the inner facing surfaces of the downward extensions 406, 407 and a substantially horizontal positioning surface 411.

In operation, the carton is positioned by the conveyor at the hole punch station 400 and the carton lift 300. The carton lift 300 clamps the edge of the carton opposite to the side where the hole is to be punched. The carton lift 300 then lifts the carton to engage it with the positioning means 402 of the hole punch to position an edge of a carton at the hole punch. The hole punch 400 punches a hole in the carton side and the carton lift 300 then lowers the carton to the conveyor. The conveyor moves the carton to the next station, which is the spout applicator 200.

Although the present invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. An apparatus for attaching a spout to a planar portion of an article, the spout including a flange and a stem, comprising:

A spout conveyor for conveying spouts to a spout stem heater;

the spout stem heater comprising a source of heat positioned in heat transfer proximity with the spout conveyor;

a bonding agent application site in proximity to the spout stem heater for applying bonding agent to the spout flange after the spout stem has been heated, including a first spout positioning means for positioning the spout at the bonding agent application site;

a spout conveyor for conveying spouts to which bonding agent has been applied to a spout applicator, including a second spout positioning means for positioning the bonding agent applied spout relative to the spout applicator; and an article positioning means having an article positioning surface thereon for positioning the planar portion of the article, the article positioning means being located at a predetermined position relative to the spout applicator, whereby spouts which have been heated and to which bonding agent has been applied are attached to the planar portion of the article, wherein the planar portion has an edge and a hole formed in the planar portion a predetermined distance from the edge and wherein the article positioning surface is substantially horizontal for positioning the edge of the planar portion of the article, and wherein the article positioning means further includes two substantially vertical, spaced restraining surfaces for restraining the planar portion about the hole in the article near the edge portion, at least one of the vertical surfaces being angled from the vertical to guide the edge between the restraining surfaces.

2. An apparatus for attaching a spout to a planar portion of an article, the spout including a flange and a stem, comprising:

a spout conveyor for conveying spouts to a spout stem heater;

the spout stem heater comprising a source of heat positioned in heat transfer proximity with the spout conveyor;

a bonding agent application site in proximity to the spout stem heater for applying bonding agent to the spout flange after the spout stem has been heated, including a first spout positioning means for positioning the spout at the bonding agent application site;

a spout conveyor for conveying spouts to which bonding agent has been applied to a spout applicator, including a second spout positioning means for positioning the bonding agent applied spout relative to the spout applicator; and an article positioning means having an article positioning surface thereon for positioning the planar portion of the article, the article positioning means being located at a predetermined position relative to the spout applicator, whereby spouts which have been heated and to which bonding agent has been applied are attached to the planar portion of the article, wherein the article positioning means further comprises a lifting device located above the article wherein the lifting device grabs an edge of a second planar portion of the article from above and raises the article to the article positioning surface so that the edge of the first planar portion is guided by the article positioning means to the article positioning surface.

3. The apparatus as claimed in claim 2, wherein the lifting device includes a clamp means for clamping the edge of the second planar portion of the article and a means for lifting the clamp means.

4. An apparatus for attaching a spout to a planar portion of an article, the spout including a flange and a stem, comprising:

a spout conveyor for conveying spouts to a spout stem heater;

the spout stem heater comprising a source of heat positioned in heat transfer proximity with the spout conveyor;

a bonding agent application site in proximity to the spout stem heater for applying bonding agent to the spout flange after the spout stem has been heated, including a first spout positioning means for positioning the spout at the bonding agent application site;

a spout conveyor for conveying spouts to which bonding agent has been applied to a spout applicator, including a second spout positioning means for positioning the bonding agent applied spout relative to the spout applicator; and an article positioning means having an article positioning surface thereon for positioning the planar portion of the article, the article positioning means being located at a predetermined position relative to the spout applicator, whereby spouts which have been heated and to which bonding agent has been applied are attached to the planar portion of the article, wherein the first spout positioning means further includes a spout feeder comprising a track which conveys spouts to the bonding application site and an escapement and a gate which then position the spout over a spout lifting device, where the escapement comprises a rotatable body having two positioning fingers which separate a spout in the track, guide the spout to the spout lifting device and restrain a next-in-line spout.

5. An apparatus for attaching a spout to a planar portion of an article wherein the planar portion has an edge and the spout has an attached flange and stem, comprising:

an article conveying means;

a hole punch;

a first article positioning means including a first article positioning surface, the first article positioning means being located at a predetermined position relative to the hole punch for positioning the edge of the planar portion for punching a hole in the planar portion;

a first article lifting device comprising a clamp for clamping the planar portion of the article and a means to lift the clamped article so that the edge of the planar position engages the first article positioning surface;

a spout applicator;

a second article positioning means including a second article positioning surface thereon, the article positioning means being located at a predetermined position relative to the spout applicator for positioning the edge of the planar portion relative to the spout applicator;

a second article lifting device comprising a clamp for clamping the planar portion of the article and a means to lift the clamped article so that the edge of the planar portion engages the second article positioning surface;

a vibratory spout conveyor;

a spout stem heater comprising a source of heat positioned in heat transfer proximity with the vibratory spout convey or means, the spout stem heater heating the stem of the spout; positioning surface, the first article positioning means being located at a predetermined position relative to the hole punch for positioning the edge of the planar portion for punching a hole in the planar portion;

a first article lifting device comprising a clamp for clamping the planar portion of the article and a means to lift the clamped article so that the edge of the planar position engages the first article positioning surface;

a spout applicator;

a second article positioning means including a second article positioning surface thereon, the article positioning means being located at a predetermined position relative to the spout applicator for positioning the edge of the planar portion relative to the spout applicator;

a second article lifting device comprising a clamp for clamping the planar portion of the article and a means to lift the clamped article so that the edge of the planar portion engages the second article positioning surface;

a vibratory spout conveyor;

a spout stem heater comprising a source of heat positioned in heat transfer proximity with the vibratory spout convey or means, the spout stem heater heating the stem of the spout;

a bonding agent application site located downstream of the spout stem heater;

a first spout positioning means for positioning the spout at the bonding agent application site, the positioning means comprising an escapement and gate to position a spout over a spout lift, and a suction cup attached to a source of suction and mounted on a lifting shaft of an air cylinder, the cylinder being mounted for rotation on a drive pulley;

a spout air conveyor means for conveying spouts to which bonding agent has been applied from the bonding agent application site;

a spout hopper which accepts spouts from the spout air conveyor;

a gravity track to convey spouts from the hopper to the spout applicator;

a second spout positioning means for positioning the spouts to which bonding agent has been applied relative to the spout applicator, such that the spout applicator applies spouts to the planar position of the article which has been positioned by the second article positioning means.

* * * * *